(12) United States Patent
Lang et al.

(10) Patent No.: US 11,745,570 B2
(45) Date of Patent: Sep. 5, 2023

(54) RETRACTABLE SUNSHADE FOR A VEHICLE

(71) Applicants: Robert Lang, Ramona, CA (US); Jed L. Firebaugh, Lake Balboa, CA (US)

(72) Inventors: Robert Lang, Ramona, CA (US); Jed L. Firebaugh, Lake Balboa, CA (US)

(*) Notice: Subject to any disclaimer, the term of this patent is extended or adjusted under 35 U.S.C. 154(b) by 0 days.

(21) Appl. No.: 17/951,563

(22) Filed: Sep. 23, 2022

(65) Prior Publication Data
US 2023/0086011 A1 Mar. 23, 2023

Related U.S. Application Data

(60) Provisional application No. 63/247,617, filed on Sep. 23, 2021.

(51) Int. Cl.
*B60J 7/10* (2006.01)
*B60J 7/06* (2006.01)
*B60J 7/00* (2006.01)

(52) U.S. Cl.
CPC ............ *B60J 7/104* (2013.01); *B60J 7/0023* (2013.01); *B60J 7/061* (2013.01)

(58) Field of Classification Search
None
See application file for complete search history.

(56) References Cited

U.S. PATENT DOCUMENTS

| | | | |
|---|---|---|---|
| 5,141,283 A | 8/1992 | Omoto et al. | |
| 5,460,409 A * | 10/1995 | Conner | B60R 21/06 296/214 |
| 6,241,305 B1 | 6/2001 | Troeger et al. | |
| 6,409,259 B1 | 6/2002 | Patelczyk et al. | |
| 6,758,517 B1 * | 7/2004 | Raasakka | B60J 7/0023 296/214 |
| 7,240,960 B2 | 7/2007 | Fallis, III et al. | |
| 7,416,247 B2 | 8/2008 | Dunneback et al. | |
| 7,703,842 B2 | 4/2010 | Fujishima | |
| 7,828,364 B2 | 11/2010 | Causey | |
| 9,114,690 B1 | 8/2015 | Bowles et al. | |
| 9,376,002 B2 | 6/2016 | Bennett et al. | |

(Continued)

OTHER PUBLICATIONS

"Retractable Sunshade Jeep 2007-2018 Wrangler JK," bestop.com. https://www.bestop.com/products/retractable-sunshade-jeep-2007-2018-wrangler-jk-mesh/ [Date accessed: May 26, 2021].

*Primary Examiner* — Joseph D. Pape
(74) *Attorney, Agent, or Firm* — Bold IP, PLLC; Binita Singh

(57) ABSTRACT

The present invention is a retractable sunshade assembly that can be connected to an open-top of a vehicle that has roll bars. The sunshade assembly includes one or more clamps, a pair of parallel support beams, and a sunshade panel. The one or more clamps fasten to roll bars on a driver side and on a passenger side, The pair of parallel support beams connect onto the clamps, such that the supports panels are horizontally aligned to the respective roll bars and parallel to each other. The sunshade panel is configured to connect to and span between the pair of support beams which serve as a guide for the sunshade panel to retract and extend within. A latch mechanism connected to a handle can be actuated to hold the sunshade panel in a desired location along the pair of support beams, enabling customized levels of sun shading.

24 Claims, 14 Drawing Sheets

(56) References Cited

U.S. PATENT DOCUMENTS

| | | |
|---|---|---|
| 9,539,886 B2 | 1/2017 | Singer |
| 10,124,655 B2 | 11/2018 | Langevin |
| 10,457,129 B2 | 10/2019 | Stickles et al. |
| 10,471,879 B1 | 11/2019 | Copp et al. |
| 10,603,994 B2 | 3/2020 | Haberkamp et al. |
| 10,857,860 B2 | 12/2020 | Janssen |
| 11,007,854 B2 | 5/2021 | Dexter |
| 2005/0280293 A1 | 12/2005 | MacNee, III et al. |
| 2019/0054806 A1* | 2/2019 | Getzschman .......... B60J 7/1858 |
| 2020/0223300 A1 | 7/2020 | Smith et al. |
| 2020/0254859 A1 | 8/2020 | Gauci |

* cited by examiner

RETRACTABLE SUNSHADE FOR A VEHICLE

CROSS REFERENCE TO RELATED APPLICATION

This application is a non-provisional application which claims priority to U.S. Provisional Patent Application No. 63/247,617 filed on Sep. 23, 2021, which is incorporated by reference in its entirety.

FIELD OF THE DISCLOSURE

The present invention is directed to a sliding roof structure for open top vehicles, and more particularly to a roof structure that can be opened and closed.

BACKGROUND

Open roof four-wheel drive vehicles are a popular option for some drivers. There are many reasons drivers purchase an open roof four-wheel drive, including and not limited to their off-road capabilities due to their four-wheel drive and suspension system, versatility for everyday driving or tackling off-road terrain, the ability to upgrade by adding accessories, and other capabilities. There is also a culture associated with individuals who are devotees to the lifestyle that is encapsulated by the open roof four-wheel drive vehicles.

A driver of an open roof four-wheel drive vehicle has the ability to add accessories, among which can be adding a hardtop or soft top for the open top. This allows the driver to choose to cover the top when it is raining, or a warm sunny day. There are advantages and some disadvantages to use of current hardtop/soft tops available. For example, a driver of a vehicle with a motorized retractable soft top or hardtop must come to a stop to extend or retract the soft top. In some cases, even a motorized soft top or hardtop must stop the vehicle to retract or extend the top. As a result, such a process causes an inconvenience and/or travel delay, especially if the driver must find a place to pull over to stop. Another issue that may be encountered with the current hardtop/soft top is that there is no flexibility of opening/closing of the top for the occupants of the four-wheel drive vehicle. For example, an occupant of the front seat may want the top to be extended (i.e., closed) leaving the occupants in the rear seats without an option of having an open top. Or the occupants in the front seat want the top retracted (i.e., open) thus again leaving the occupants in the rear without a choice but to have the top open. In these scenarios, there is only an option of installing one hardtop/soft top which can retract fully or partially, but with not much choice for the back seat occupants.

Thus, there still exists a need for an improved retractable cover for an open top four-wheel drive vehicle.

SUMMARY

One or more embodiments are provided below for a retractable sunshade assembly that can be removably installed on an open roof of a four-wheel drive vehicle. The retractable sunshade assembly may be installed over a section of the open roof corresponding to front seats (e.g., driver seat and front passenger seat) of the vehicle. The retractable sunshade assembly may be installed over a section of the open roof that corresponds to the back seats of the vehicle. The retractable sunshade assembly can be installed over each section independent of the other providing the convenience and autonomy to the respective occupants of the seats.

The one or more embodiments of the retractable sunshade assembly include one or more clamps, a pair of parallel support beams, and a sunshade panel. The one or more clamps fasten to a roll bar on a driver side and a roll bar on a passenger side, which are a part of the vehicle and found at the open roof of a vehicle. The pair of parallel support beams connect onto the clamps, wherein a first support beam connects to the clamps on the driver side and a second support beam connects to the clamps on the passenger side such that the supports panels are horizontally aligned to the respective roll bars and parallel to each other. The sunshade panel is configured to connect to and span between the pair of support beams which serve as a guide for the sunshade panel to be retracted and extended within. In some embodiments, a handle on the sunshade panel can be actuated to extend one or more locking pins which hold the sunshade panel in a desired location along the pair of support beams, which enables customized levels of sun shading.

The disclosed device is unique and may provide significant advantages when compared with other devices and solutions known in the arts because it provides a retractable top that can be extended and retracted with ease while the vehicle is motion. The disclosed device also provides a convenience for the front seat occupants and the back seat occupants to have a retractable top over their sections to extend and retract independent of the other.

Other advantageous features as well as other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
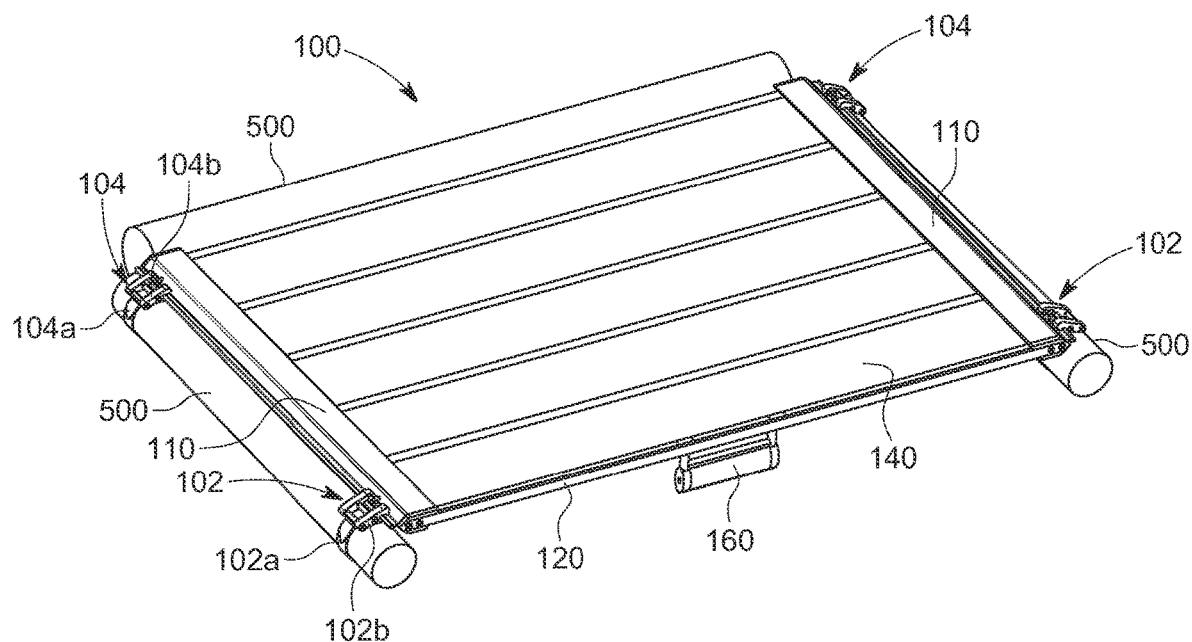
FIG. 1 shows an example perspective view of a retractable sunshade assembly installed onto a roll bar of a vehicle according to one or more non-limiting embodiments.

In the Summary above, in this Detailed Description, the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limits include both numbers. For example, "25 to 100" means a range whose lower limit is 25 and upper limit is 100 and includes both 25 and 100. Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "coupled to" as used herein may mean a direct or indirect connection via one or more components.

Referring now to the drawings and the following written description of the present invention, it will be readily understood by those persons skilled in the art that the present invention is susceptible to broad utility and application. Many embodiments and adaptations of the present invention other than those described herein, as well as many variations, modifications, and equivalent arrangements will be apparent from or reasonably suggested by the present invention and the detailed description thereof, without departing from the substance or scope of the present invention. This disclosure is only illustrative and exemplary of the present invention and is made merely for purposes of providing a full and enabling disclosure of the invention.

Figure 2:
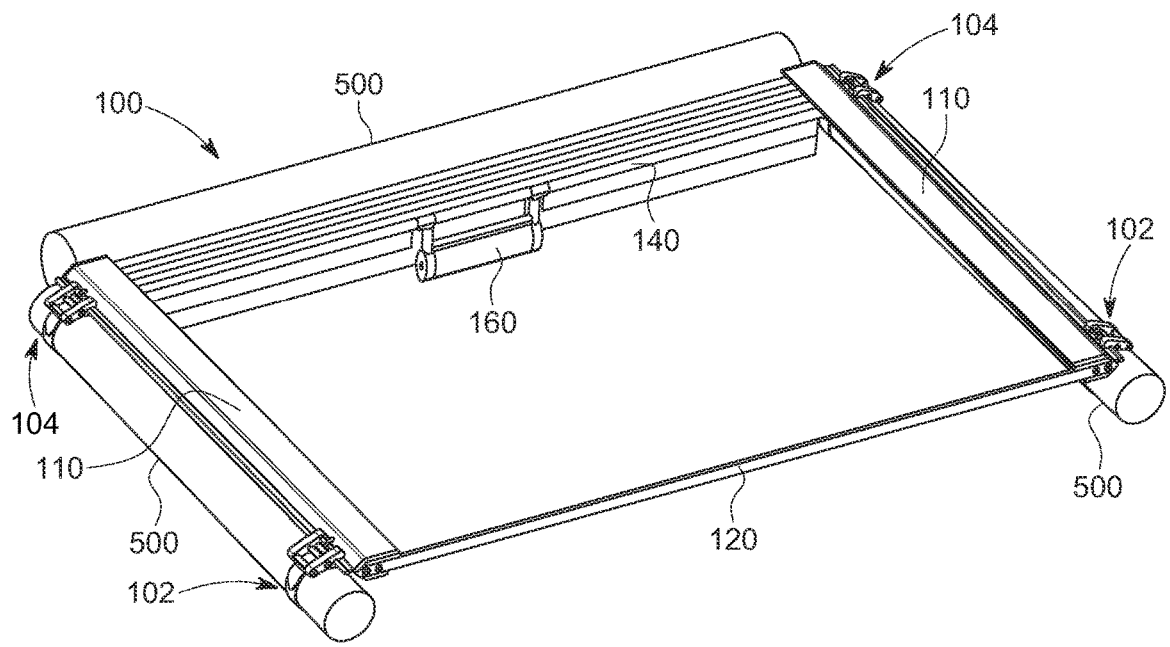
FIG. 2 shows a perspective view of the retractable sunshade assembly with the sunshade panel in a fully retracted position according to one or more non-limiting embodiments.

The present invention describes a retractable sunshade assembly that can be removably installed on an open roof of a four-wheel drive vehicle. The retractable sunshade assembly can be operated to extend and retract (open and close the open the top) while the vehicle is in motion. FIG. 1 and FIG. 2 show a perspective view of an example of a non-limiting embodiment of a retractable sunshade assembly 100 installed on a model of roll bars 500 emulating roll bars on a four-wheel drive vehicle with an open top. FIG. 1 illustrates the retractable sunshade assembly in a fully extended (or closed) position and FIG. 2 illustrates the retractable sunshade assembly in a fully retracted (or open) position. The sunshade assembly 100 comprises a set of clamps including a pair of front clamps 102 and a pair of rear clamps 104, a pair of parallel support beams 110, and a sunshade panel 140. The clamps 102, 104 are configured to connect to the roll bars 500 at the open rooftop of a four-wheel drive vehicle. The roll bars 500 may be positioned on either side of the vehicle, one above the driver side and a second above the passenger side. The pair of parallel support beams 110 attach to the clamps 102, 104, wherein a first support beam attaches to the clamps 102 on the driver side and a second support beam attaches to the clamps 102 on the passenger side. The sunshade assembly 140 is designed to be movable and spans between the pair of parallel support beams 110 to connect to each support beam 110. The pair of parallel support beams 110 serve as a guide for the sunshade panel 140 to be retracted and extended within. Movement of the sunshade panel 140 is controlled by a handle 160 (discussed below) comprising part of the sunshade panel 140. It is to be understood that the sunshade assembly 100 may be configured in different sizes to accommodate and fit within an open top of most any type of four-wheel drive vehicle that allows the assembly to function as described herein. An example of an open top vehicle that the sunshade assembly 100 may be designed to fit within is a JEEP WRANGLER. This example is not intended to be limiting.

Figure 4A:
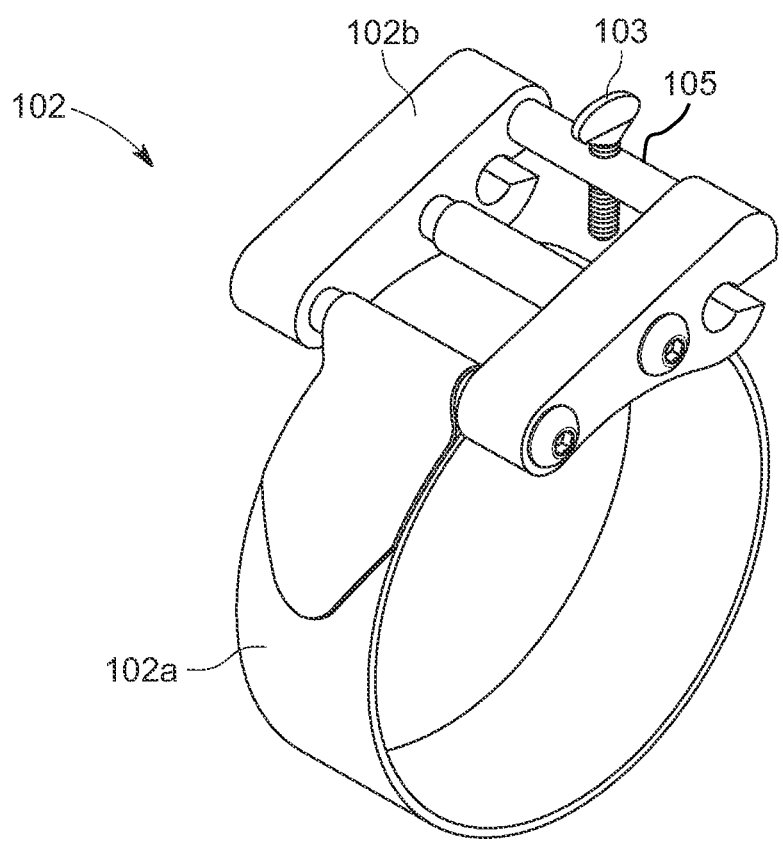
FIG. 4A shows a perspective view of a clamp in accordance with one or more non-limiting embodiments.

In one or more embodiment, the set of clamps 102, 104 which may also be referred to as clamps 102, 104 are configured to be fastened to the roll bar 500 on a vehicle. The set of clamps 102 are also configured such that they are easily removable from the roll bars 500. In the Figures shown, the pair of front clamps 102 are intended to be positioned toward a front of vehicle on the roll bars 500 and the pair of rear clamps 104 are intended to be positioned behind the front pair of clamps 102 on the roll bars 500. As best seen in FIG. 4A, each clamp 102, 104 also includes a strap 102a, 104a and a hook 102b, 104b, respectively. The straps 102a, 104a loop around the roll bar 500 and the hooks 102b, 104b connect to one of the support beams 110. The strap 102a, 104a may be fashioned from a sturdy and durable material.

Figure 3A:
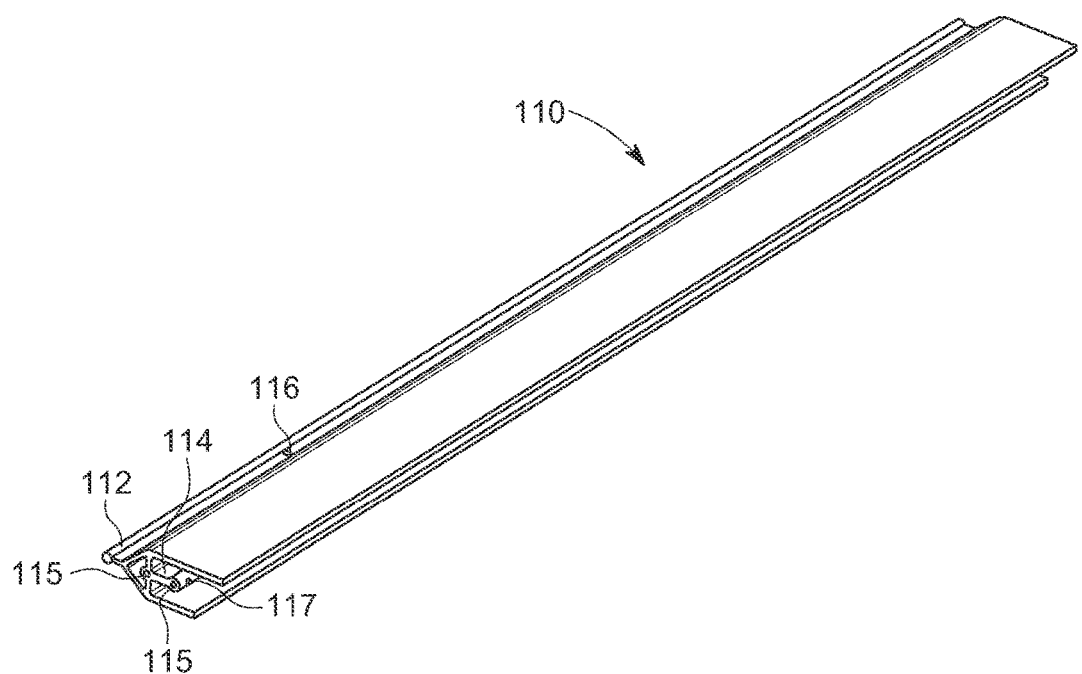
FIG. 3A shows a perspective view of a single roof rail of the retractable sunshade assembly according to one or more non-limiting embodiments.
Figure 3B:
FIG. 3B shows a side view of the single roof rail of the retractable sunshade assembly according to one or more non-limiting embodiments.

Each of the pair of support beams 110 are designed to attach to the clamps 102, 104 and to the sunshade panel 140. FIGS. 3A and 3B illustrate a perspective view and an inside side view of a single support beam 110, respectively. This illustration and description are identical for both support beams comprising the pair of support beams 110. As shown, the support beam 110 has an outer rail 112, and an inner rail 114. The outer rail 112 is configured on a side facing the clamps 102, 104. The inner rail 114 is configured on a side opposite the outer rail 112 to connect with the sunshade panel 140. The hooks 102b, 104b on the clamps 102, 104, respectively, connect to the outer rail 112 with the inner rails 114 on each support beam 110 facing each other. The pair of support beams 110 are connected to the clamps 102, 104 by sliding the outer rails 112 through a notch on hooks 102b, 104b on the clamps 102, 104 which are configured to receive the outer rail 112.

Figure 4B:
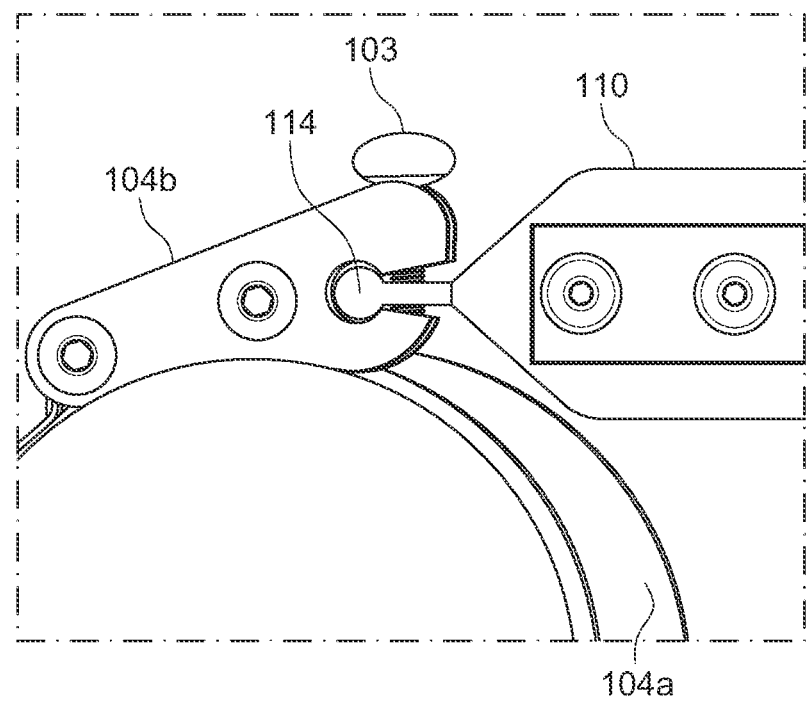
FIG. 4B shows a close-up front view of a clamp connected to a roof rail according to one or more non-limiting embodiments.

As best seen in FIGS. 4A and 4B, the pair of front clamps 102 include a fastener 103, such as a thumb screw, that traverses through a portion of the clamp 102 and through a slot 116 in the support beams 110 to prevent the support beams from sliding once the positioned appropriately. FIG. 4A shows a perspective view of the front clamp 102. The fastener 103 traverses through a rod 105 at a front of the hook 104b. As seen in FIG. 4B, when connecting the support beam 110 to the clamps 102, 104, the rod 105 on the hook 104b places the fastener 103 directly above the slot 116 in the outer rail 112 such that the fastener 103 can be placed through the slot 116 to hold and prevent the support beam 110 from sliding between the clamps 102, 104. It is to be understood that alternatively the pair of rear clamps 104 may include the fastener 103, or alternatively both the front clamps 102 and the rear clamps 104 include the fastener 103 to hold the support beams 110 in place.

Figure 12:
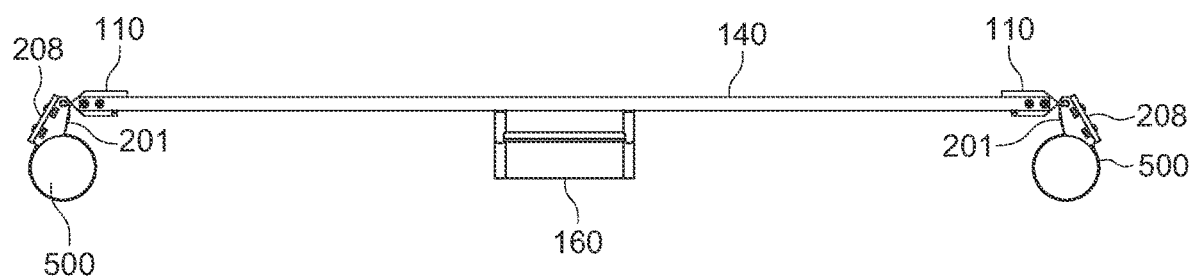
FIG. 12 shows a front view of the sunshade assembly from FIG. 11 in accordance with one or more non-limiting embodiments.
Figure 13:
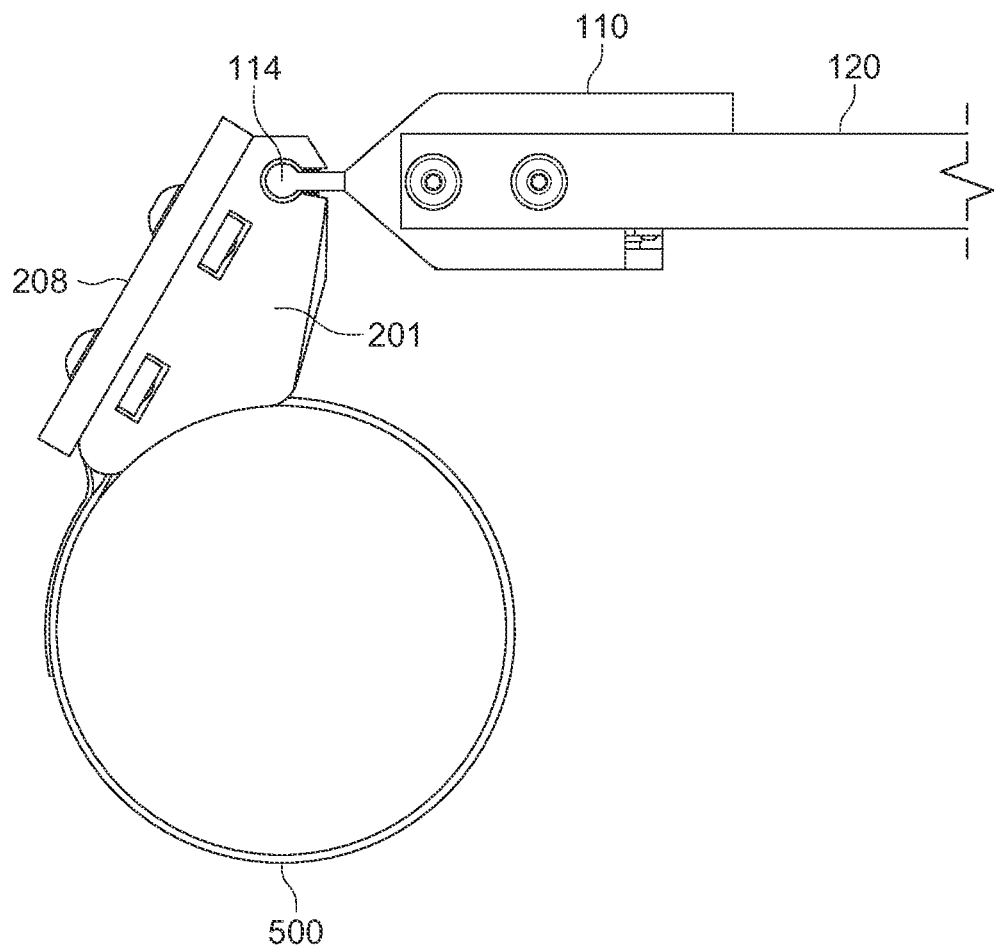
FIG. 13 shows a close-up view of a clamp connected to a support beam in accordance with one or more non-limiting embodiments.
Figure 14:
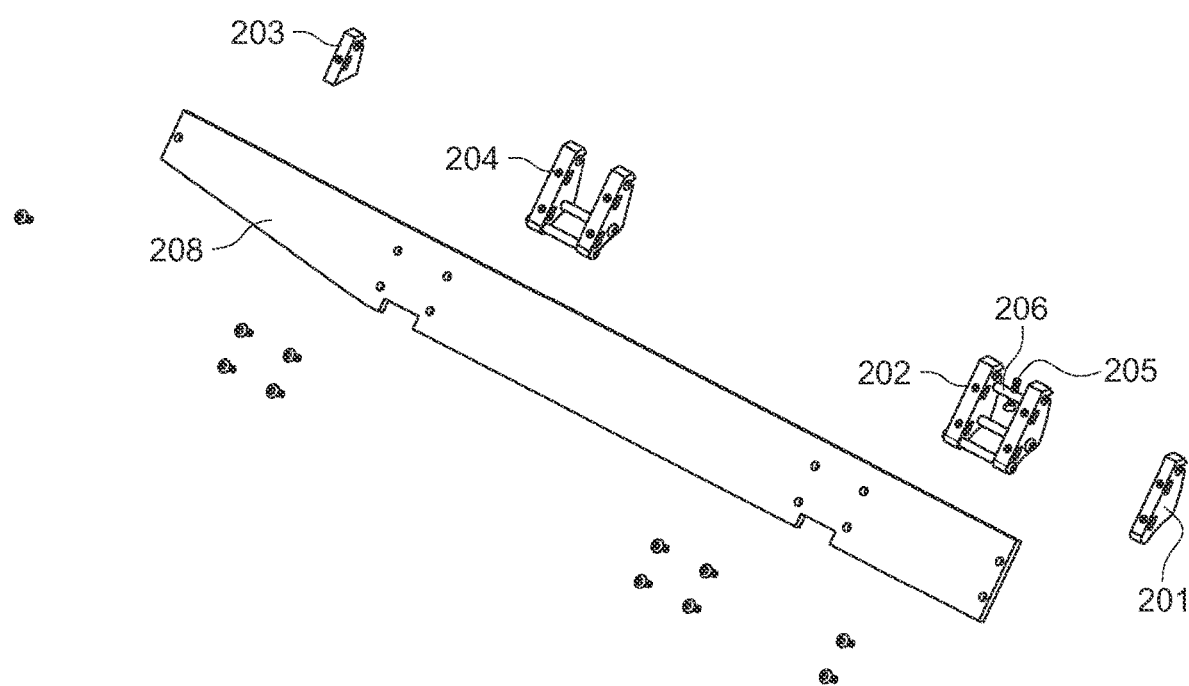
FIG. 14 shows an exploded view of the set of clamps and a fairing from FIG. 11 in accordance with one or more non-limiting embodiments.
Figure 15:
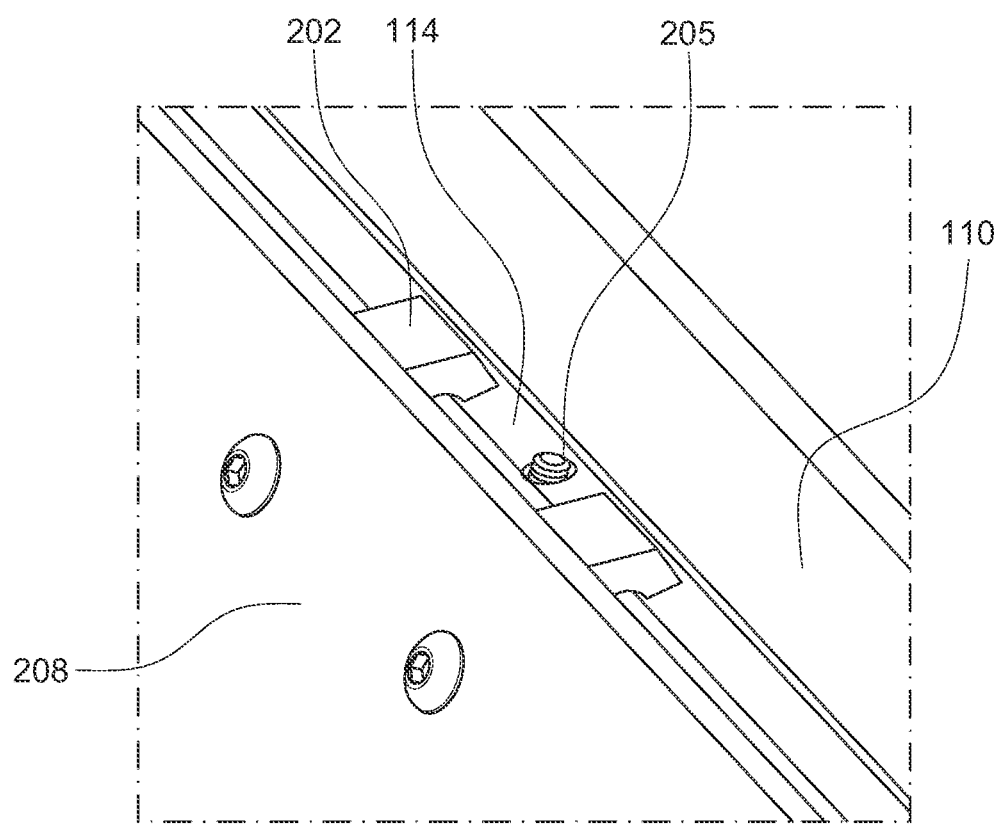
FIG. 15 shows a close-up view of a fastener from one clamp of the set of clamps engaged with a slot in the support beam in accordance with one or more non-limiting embodiments.

FIGS. 11-15 illustrate an example of an alternative configuration for a set of clamps 201, 202, 203, and 204 which are configured to elevate a position of the sunshade panel 140 to the roll bars 500 on a vehicle. As seen in FIGS. 12 and 13, this configuration raises the sunshade panel 140 and the pair of support beams 110 above a position of the roll bars 500, such that the sunshade panel 140 and the pair of support beams 110 are at least 1 inch above a parallel plane of the roll bars 500. The set of clamps comprise a pair of front end clamps 201, a pair of back end clamps 203, a pair of forward fairing clamps 202, and a pair of rear fairing clamps 204. The set of clamps 201, 202, 203, and 204 are connected to a fairing 208 to cover a gap that may be created between the roll bars 500 and the pair of support beams 110. The front end and back end clamps 201, 203 are connected to a front end and a back end of the fairing 208, respectively, and also include notches that connect to the outer rail 112 similar to the above embodiment including the set of clamps 102, 104. The front end and back end clamps 201, 203 close off a gap on each end of the fairing 208. Each of the forward fairing clamps 202 and the rear fairing clamps 204 include a loop (similar to loop 102a and 102b in the above embodiment) to attach to the roll bars 500. The forward and rear fairing clamps 202, 204 also connect to the outer rail 112 on the pair of support beams 110. As seen in FIGS. 13-15, a fastener 205, such as a thumb screw, traverses through a portion of the forward fairing clamp 202 and through the slot 116 in the support beams 110 to prevent the support beams from sliding once positioned appropriately (see FIGS. 3A and 3B for the slots 116 in the support beams 110). The fastener 205 traverses through a rod 206 at a front of the forward fairing clamp 202. In this embodiment, the fastener 205 traverses from a bottom of the rod 206 upward into the slot 116 to hold and prevent the support beam 110 from sliding between the set of clamps 201, 202, 203, and 204. It is to be understood that any of the clamps in the set of clamps can include the fastener 205 and the slot 116 in the support beams 110 can be positioned appropriately. The set of clamps 201, 202, 203, and 204 are connected to the fairing 208 by any coupling means known in the arts, including, and not limited to bolts, screws, and other coupling means.

Figure 5:
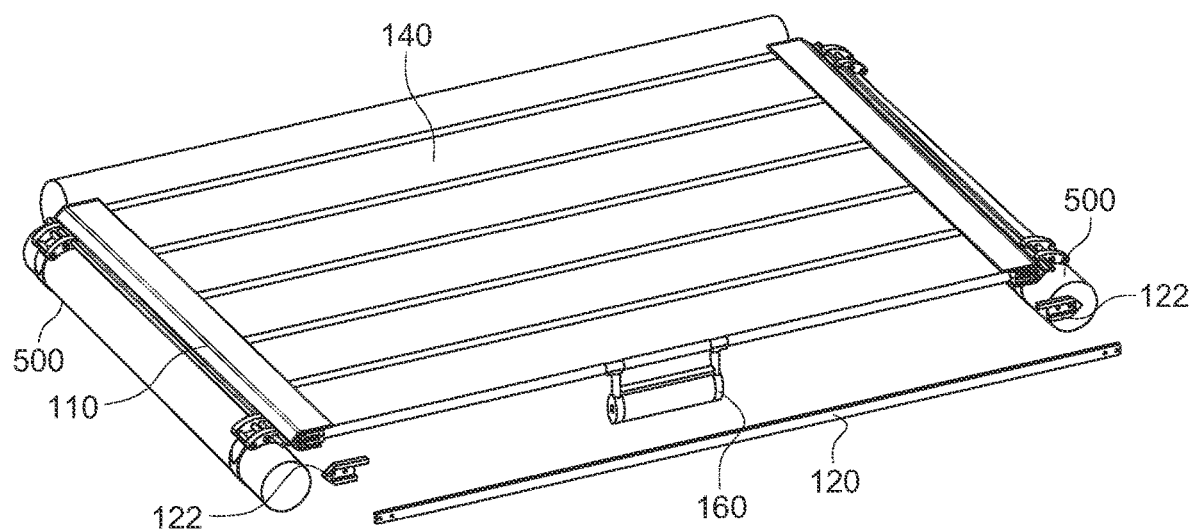
FIG. 5 shows an example of a front bar removed from the sunshade assembly according to one or more non-limiting embodiments.

FIGS. 1, 2, and 5 illustrates a front bar 120 coupled with and/or otherwise attached to the pair of support beams 110. As the name suggests, the front bar 120 is attached to a front side of the support beam 110, or what may otherwise be considered a front side of the sunshade assembly 100. The front bar 120 has a length that extends a space between the pair of support beams 110. The front bar 120 is connected to the support beams 110 using a pair of end caps 122 on either end of the front bar 120. The end caps 122 are designed to take on a cross-sectional shape of a space at the inner rail 114 of the support beams 110 such that the end caps 112 can be inserted into that space. The end caps 122 connected to the front bar 120 may be attached to the support beams 110 screws, nuts, bolts and or other coupling devices using one or more holes 115 on the front side of the support beams 110. Other coupling means are also to considered such as adhesives and/or other methods. FIGS. 2 and 4B show that the front bar 120 is coupled to the support beam 110 via screws that are positioned through the front bar 120 that traverse through into one or more holes in a front of the inner rail 114 (but this is not intended to be limiting). The front bar 120 prevents the sunshade panel 140 from sliding out of the support beams 110 once the sunshade panel 140 and the front bar 120 are installed. The sunshade panel 140 is connected to the pair of support beams before the front bar 120 and the end caps 122 are connected to the support beams 110.

The sunshade panel 140 is configured to at least partially shield an occupant space the sunshade assembly 100 is placed over. The sunshade panel 140 comprises part of the sunshade assembly 100 component that can be moved between a closed position (shown in FIG. 1) and an open position (shown in FIG. 2). As mentioned above, the sunshade panel 140 spans between the pair of parallel support beams 110. The sunshade panel 140 connects to the pair of support beams 110 which act as a guide and facilitate a movement of the sunshade panel 140.

Figure 6:
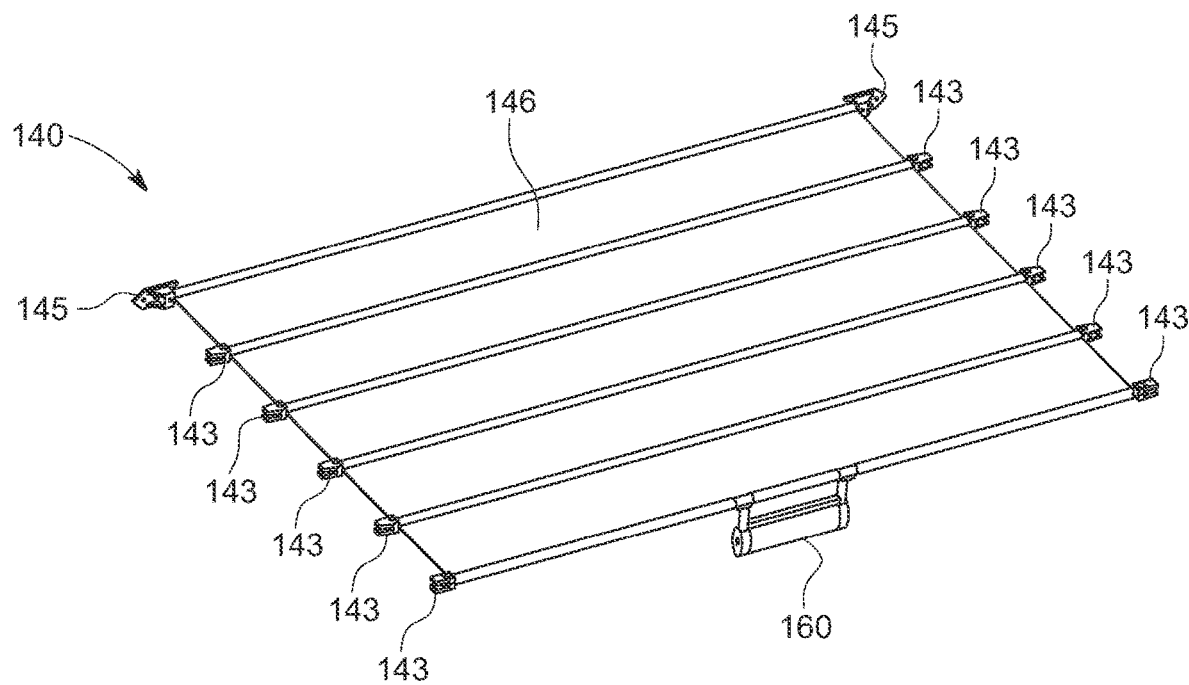
FIG. 6 shows only the sunshade panel in accordance with one or more non-limiting embodiments.
Figure 7A:
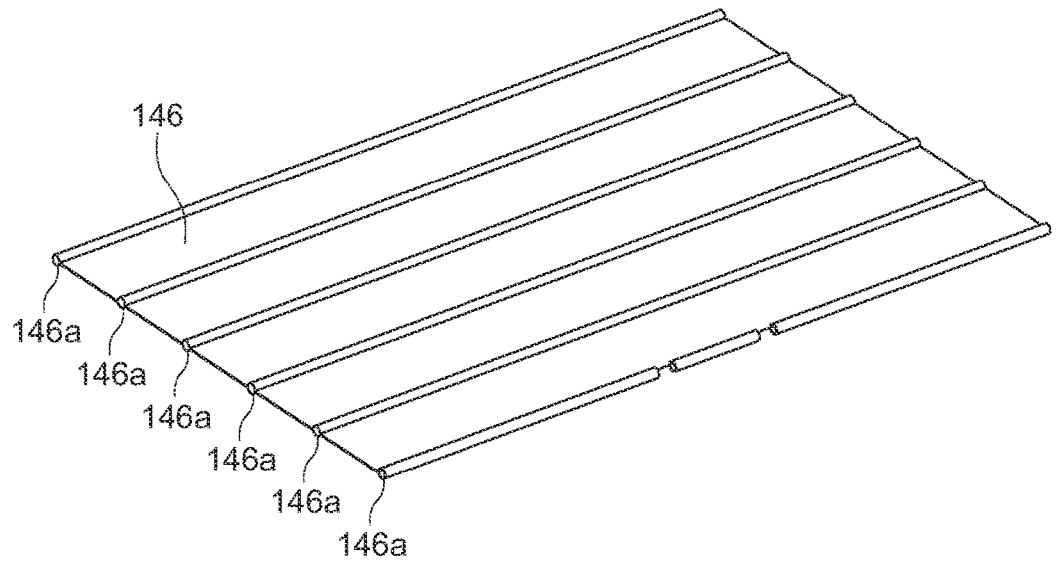
FIG. 7A shows a top view of a cover comprising the sunshade panel according to one or more non-limiting embodiments.
Figure 7B:
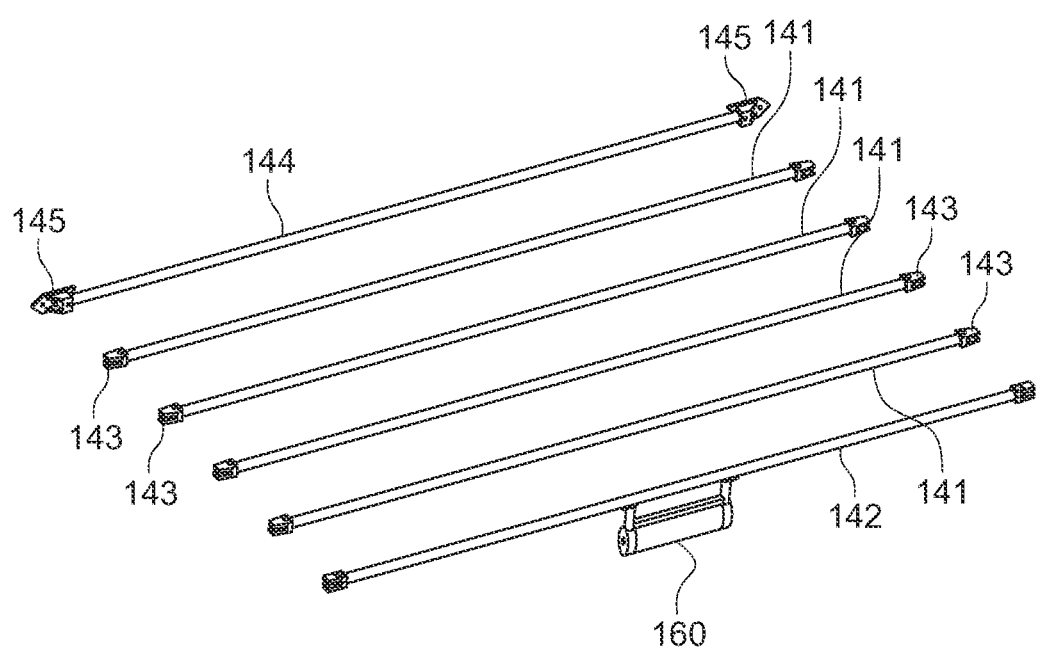
FIG. 7B shows a plurality of rods comprising the sunshade panel in accordance with one or more non-limiting embodiments.

By way of a non-limiting example, FIGS. 6 to 8C illustrate a configuration of the sunshade panel 140 which is shown to comprise a front rod 142, one or more center rods 141, a rear rod 144, and a cover 146. The cover 146 is connected to the front rod 142, the one or more center rods 141, and the rear 144 (which may collectively be referred to as a plurality of rods). FIG. 6 illustrates the configured sunshade panel 140, along with the handle 160, that will be connected to the pair of support beams 110. FIG. 7A illustrates the cover 146 only, whereas FIG. 7B illustrates the front rod 142, one or more center rods 141, and the rear rod 144. Referring to FIG. 7A, the cover 146 includes two or more channels 146a equidistance to each other wherein each individual channel 146a is configured for one rod 142, 141, 144 to fit within. FIG. 6 is intended to illustrate the front rod 142, the one or more center rods 141, and the rear rod 144 assembled into the cover 146 and show a general appearance of the non-limiting example of the sunshade panel 140. As can be seen, each of plurality of the rods, including the front rod 142, the rear rod 144, and the one or more center rods 141 spans a width of the cover 146, wherein the width of the cover 146 spans the space between the pair of support beams 110. The cover 146 is fashioned from a fabric like material that can fold and is flexible. Other flexible material such as faux leather and leather are also within the disclosure of the cover 146.

The front rod 142, the one or more center rods 141, and the rear rod 144 are alike except that the front rod 142 and the one or more center rods 141 connect to a pair of rod ends 143 and the rear rod 144 connects to a pair of end caps 145. The pair of rod ends 143 permit a sliding motion within the pair of support beams 110 and the pair of end caps 145 makes the rear rod 144 stationary. The rear rod 144 is a stationary rod, in that the rear rod 144 is connected to a back end of the pair of support beams 110 (also the rear of the sunshade assembly 100) by the end caps 145. The rear rod 144 functions to prevent the sunshade panel 140 from sliding out the back end of the support beams 110. As discussed earlier in FIGS. 1, 2, and 5, the front bar 120 prevents the sunshade panel 140 from sliding out the front end of the support beams 110. The one or more center rods 141 and the front rod 142 move in an accordion like motion moving the cover 146 between the front bar 120 and the rear rod 144.

Figure 8A:
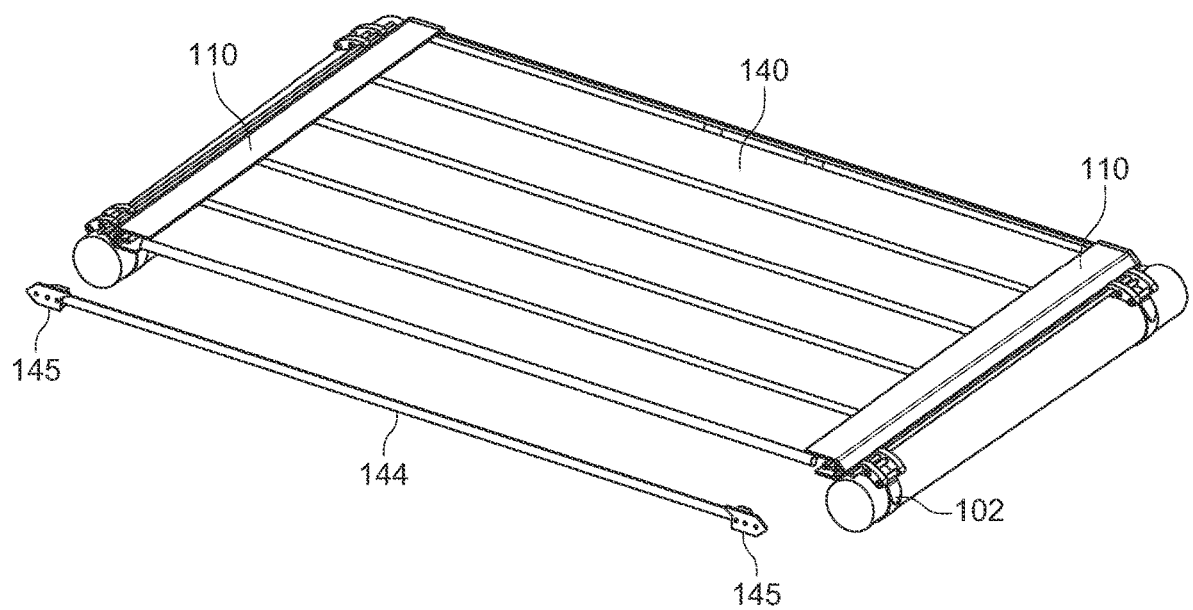
FIG. 8A shows a rear rod removed from the sunshade assembly in accordance with one or more non-limiting embodiments.
Figure 8B:
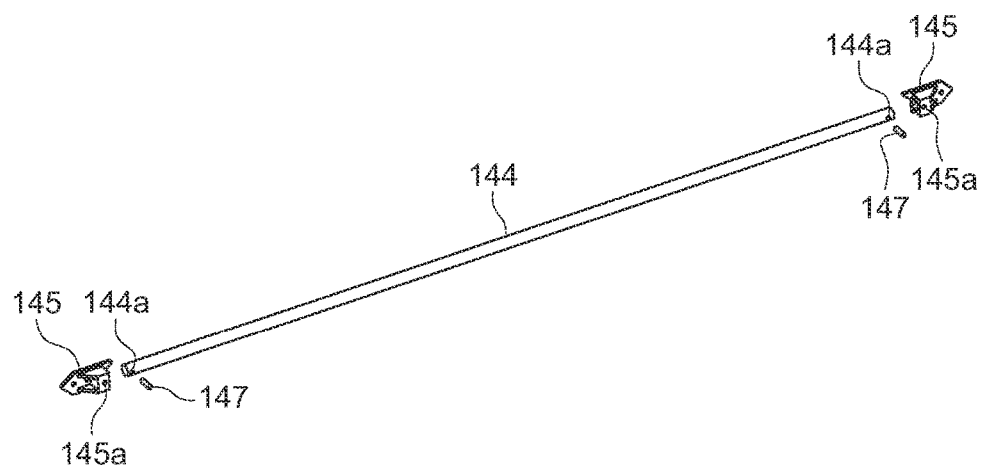
FIG. 8B shows the rear rod only in accordance with the one or more non-limiting embodiments.
Figure 8C:
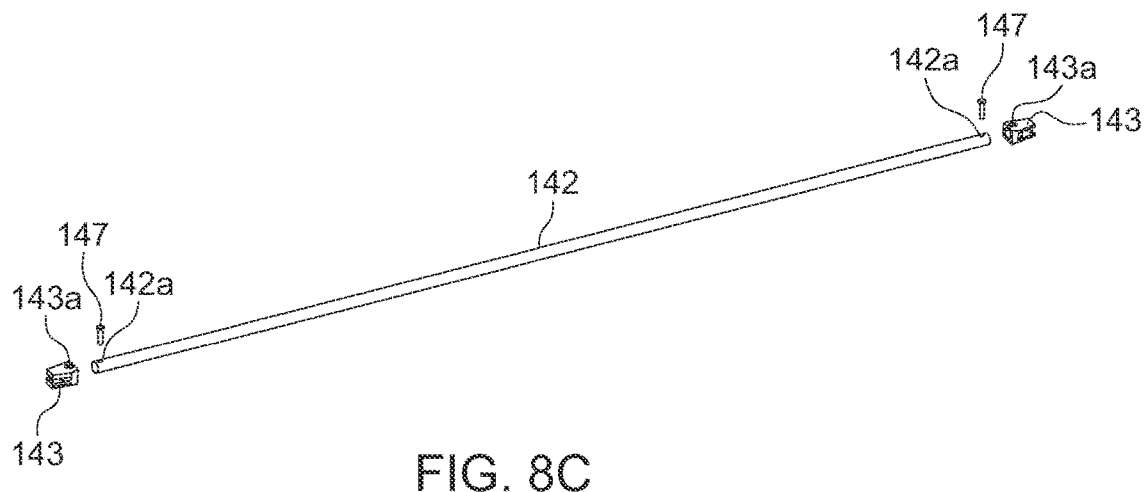
FIG. 8C shows a single rod from the plurality of rods comprising the sunshade panel in accordance with one or more non-limiting embodiments.
Figure 9A:
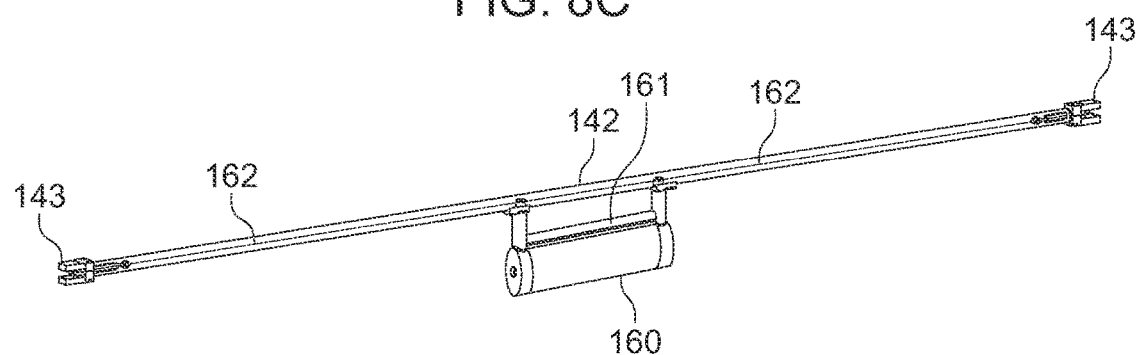
FIG. 9A is an example transparent view of a front rod to illustrate a latch mechanism disposed within the front rod in accordance with one or more non-limiting embodiments.
Figure 9B:
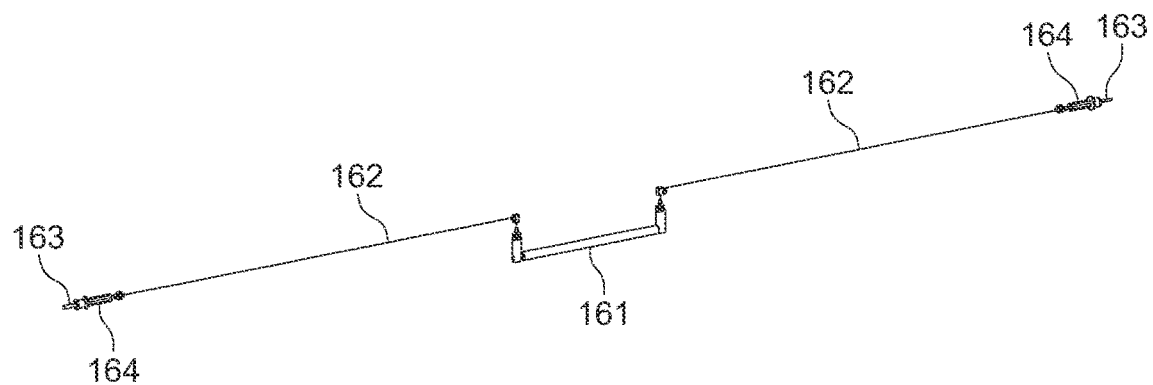
FIG. 9B shows the latch mechanism in accordance with one or more non-limiting embodiments.
Figure 9C:
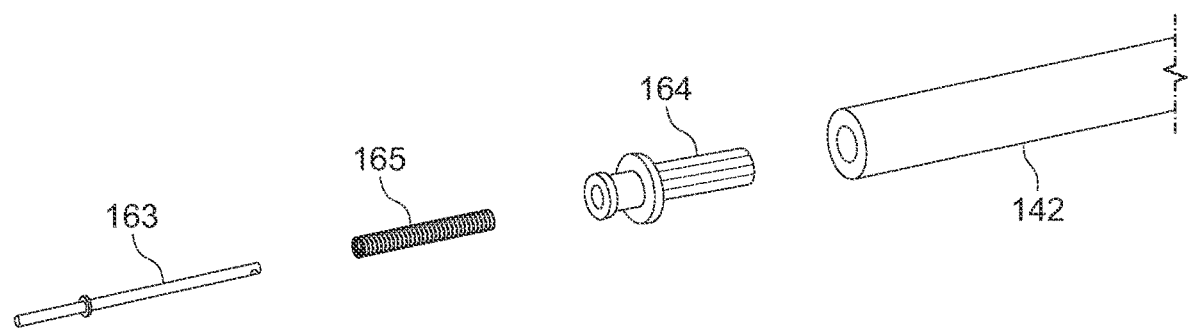
FIG. 9C shows an expanded view of part of the latch mechanism in accordance with one or more non-limiting embodiments.
Figure 10:
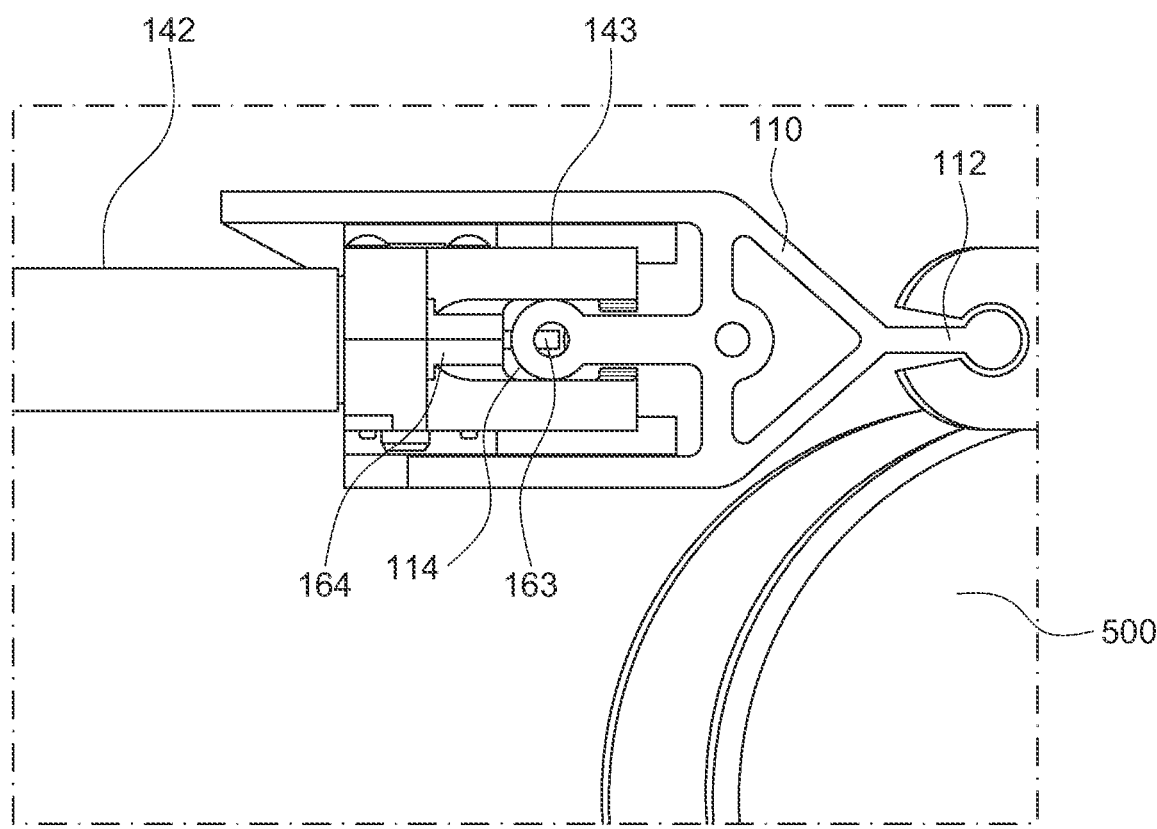
FIG. 10 shows a close-up view of a latch mechanism engaging with a support beam in accordance with one or more non-limiting embodiments.
Figure 11:
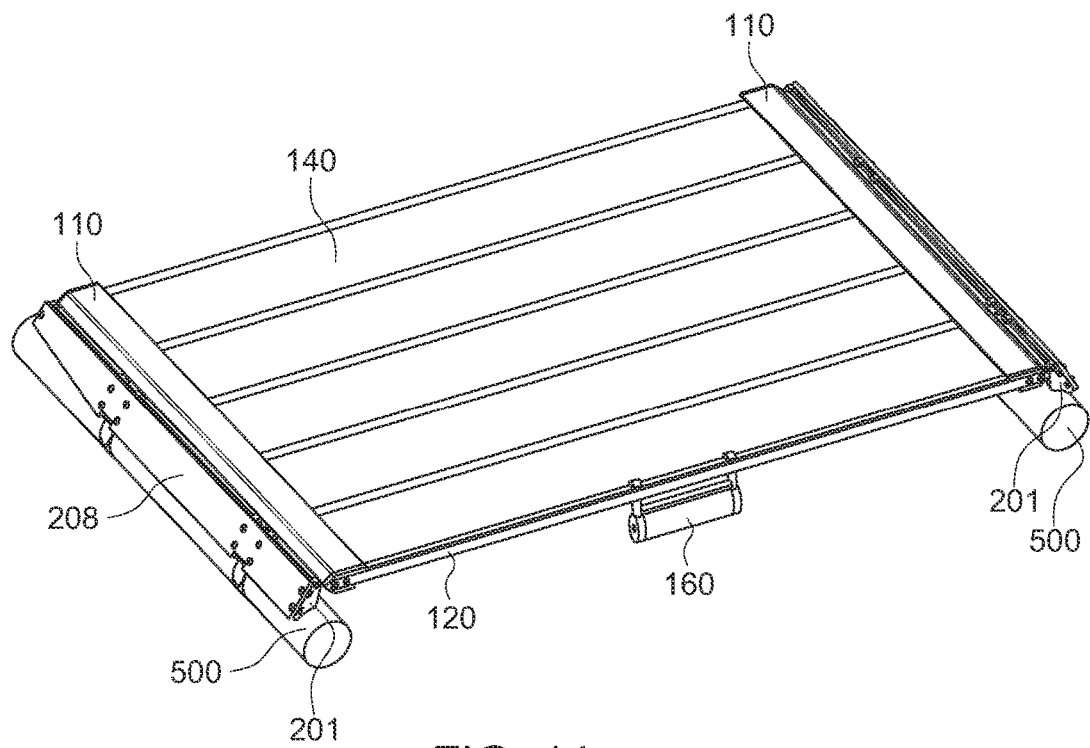
FIG. 11 shows a perspective view of an alternative assembly of a set of clamps connected to a pair of support beams and a sunshade panel in accordance with one or more non-limiting embodiments.

FIG. 8C illustrates one of the center rods 141 and the pair of rod ends 143 to illustrate the connection which is descriptive of all of the one or more center rods 141. The illustration is also intended to be descriptive of the connection between the pair of rod ends 143 and the front rod 142. The pair of rod ends 143 are connected to the one or more center rods 141 by slipping each rod end 143 over an end of the one or more center rods 141. The rod ends 143 are then coupled by inserting a pin 147 into an opening 143a in the rod end 143 that traverses through into an opening 142a in the one or more center rods 141. As can be seen, each end of the one or more center rods 141 has an opening 142a and is connected to one of the pair of rod ends 143. The pin 147 may be a quick release pin, such that the pin 147 can be easily removed to allow the rod ends 143 to be removed and thus the one or more rods 141 from within the cover 146, if necessary. Referring to FIG. 6, the one or more center rods 141 are inserted through the cover 146 with the pair of rod ends 143 visible along each side of the cover 146. To assemble, the one or more center rods 141 are inserted through the channels 146a with the openings 142a just extending outside the channels 146a on each side of the cover 146. The pair of rod ends 143 are then connected to the one or more center rods 141 using the pin 147. The rod ends 143 are positioned onto the inner rails 114 of the pair of support beams 110 and are configured to slide along the inner rails 114. As discussed above, the sunshade panel 140 spans between the pair of support beams 110. The rod ends 143 are configured such that they can slide along the inner rail of the support beam 110 and thus move the connected cover 146 in the accordion motion between the rear rod 144 and the front bar 120.

Referring to FIGS. 8A and 8B, the rear rod 144 with the pair of end caps 145 is shown. As mentioned above the rear rod 144 is similar to the front rod 142 and the one or more center rods 141, except that the rear rod 144 is stationary which is due to the end caps 145 and therefore the function being to prevent the sunshade panel 140 from sliding off the back end of the support beams 110. The end caps 145 are configured similar to the end caps 122 of the front bar (shown in FIG. 5) in that they take on a cross sectional shape of the inner rail 114 section with the only difference being that the pair of end caps 145 are configured to slip onto the ends of the rear rod 144. The end caps 145 cover the back end of the support beam 110 to not only prevent the sunshade assembly 140 from sliding off the back end, but also provides an aesthetic appearance. The pair of end caps 145 are connected to the rear rod 144 by slipping an end cap 145 over each end of the rear rod 144. The end caps 145 are then coupled by inserting the pin 147 into an opening 145a in the end cap 145a that traverses through into an opening 144a in the rear rod 142. As can be seen, each end of the rear rod 144 has the opening 144a and is connected to one of the pair of rod ends 143. The pin 147 may be a quick release pin, such that the pin 147 can be easily removed to allow the end caps 145 to be removed and thus the rear rods 144 from within the cover 146, if necessary. As seen in FIG. 6, the rear rod 144 is inserted through the cover 146 with the pair of end caps 145 visible along each side of the cover 146. The rear rod 144 is assembled as above in the discussion for the one or more rods 142. The rear rod 144 is inserted through the channel 146a (at an end of the cover 146) with the openings 144a just extending outside the channel 146a on each side of the cover 146. The pair of end caps 145 are then connected to the rear rod 144 using the pin 147. Once the rear rod 144 is assembled into the cover 146, the end caps 145 are connected to the back end of the support beams 110, in a similar fashion as to how the end caps 122 on the front bar 120 are connected to the front end of the support beams 110.

The cover 146 opens and closes by moving along the inner rail 114 on the support beams 110 using the handle 160. The advantage of the following assembly is that the sunshade panel 140 can be moved while the vehicle is in motion. The occupant of the vehicle can grab the handle 160 and pull backward or forward to slide the sunshade panel 140 along the support beams 110. In the one or more non-limiting embodiments shown, the handle 160 is connected to the front rod 142. Specifically, the handle 160 is connected to the front rod 142 which is positioned closest to the front bar 120 or the front end of the support beams 110. The front bar 120 is closer to a front end of the vehicle and the rear rod 144 (which is also stationary) is further away from the front end of the vehicle, or closer to the back end of the vehicle. Thus, the handle 160 opens the sunshade panel 140 by sliding away from the front bar 120 toward the rear rod 144. And the handle 160 closes the sunshade panel 140 by moving away from the rear rod 144 toward the front bar 120.

Referring to FIGS. 3A, 3B, 9A to 9C, and 10, the handle 160 includes a latch mechanism which locks the sunshade panel 140 into a position the sunshade panel 140 is moved to (closed or an open). The advantage of the latch mechanism is to prevent the sunshade panel 140 from sliding within the pair of support beams 110 when the sunshade panel 140 is positioned in the open or closed position. As seen in FIGS. 3A and 3B, the support beam 110 has one or more pin slots 117 strategically placed along a length of the inner rail 114. The figures illustrate two pin slots 117 positioned along the length of the inner rail 114 on a side facing the opposing support beam. It is to be understood that both support beams comprising the pair of support beams 110 may have the one or more pin slots 117. Alternatively, only one support beam 110 may have the one or more pin slots 117. The one or more pin slots 117 are configured for a pair of latch pins 163 to insert into to engage a latch mechanism (discussed below). As best seen in a close-up front view on FIG. 10, the latch pin 163 is inserted into the inner rail 114 through the slot (shown in FIGS. 3A and 3B). It is also to be understood that more than two slots are also within the disclosure of the sunshade assembly 100, such as an entire length of the inner rail 114 may have pin slots 117 interspersed such that the sunshade panel 140 can be partially closed/opened to an occupant's preference rather than only fully open or fully closed.

The latch mechanism comprises an actuator piece 161 which is positioned at a top of the handle 160. Further, the latch mechanism comprises a wire 162, a pair of latch pins 163, a pair of rod inserts 164, and a pair of springs 165 (best seen in FIG. 9C). Each of the pair of rod inserts 164 is inserted into each end of the front rod 142. The wire 162 is connected to the actuator piece 161 and extends toward both ends of the front rod 142. The wire 162 is also connected to the pair of latch pins 163 which are positioned within the pair of rod inserts 164. The pair of springs 165 are also inserted within the pair of rod inserts 164 around the latch pin 163. The latch mechanism can be engaged or disengaged to lock the sunshade panel 140 in place or allow the sunshade panel to slide, respectively. In the engaged position, the latch pin 163 is inserted within the pin slot 117, and the latch pin 163 is moved out of the pin slot 117 in the disengaged position.

To disengage the latch mechanism, an occupant grabs the handle 160 and applies a pressure on or squeezes the actuator piece 161, which, via the wire 162, pulls the latch pin 163 out of the pin slot 117 in the inner rail 114. When the latch mechanism is disengaged, the sunshade panel 140 can be moved back and forth along the inner rails 114 in the support beams 110. When the occupant releases the pressure on the actuator piece 161, the recoil pressure on the spring 165 pushes the latch pin 163 into one of the pin slots 117. This causes the latch mechanism to be engaged, preventing the sunshade panel 140 from sliding or moving along the inner rails 114 of the support beams 110. It is to be understood that alternate mechanisms may also be included in this disclosure, such as instead of latch pins 163, a friction mechanism may be used that uses an element that presses against the inner rail 114 to prevent movement, such as and not limited to a pin or small rod with a rubber or silicone end.

Accordingly, the present description provides for various embodiments for a retractable sunshade assembly that can be attached to an open top four-wheel drive vehicle. The retractable sunshade assembly can be used while the car is in motion and advantageously does not require a vehicle to stop moving in order to use. Advantageously, the retractable sunshade assembly can be individually placed over the front occupants and the rear occupants such that each can be used independent of the other providing the option for both occupants to use as needed. Many uses and advantages are offered by the retractable sunshade assembly as described above in one or more non-limiting embodiments in the present description.

The corresponding structures, materials, acts, and equivalents of any means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention, according to one or more embodiments described in the present description, may be practiced with modification and alteration within the spirit and scope of the appended claims. Thus, the description is to be regarded as illustrative instead of restrictive of the present invention.

What is claimed is:

1. An assembly for covering an open top in a vehicle, the assembly comprising:
    a sunshade panel configured to cover the open top of the vehicle, the sunshade panel is movable between an open position and a closed position;
    a pair of support beams connectable to the sunshade panel, wherein each support beam of the pair of support beams has an outer rail and an inner rail, wherein the pair of support beams are positioned on opposing sides of the open top, wherein the sunshade panel spans between the pair of support beams and connects to the inner rail on each support beam of the pair of support beams, wherein the pair of support beams guide a movement of the sunshade panel;
    a set of clamps connectable to the pair of support beams, wherein the set of clamps removably connect the pair of support beams and the sunshade panel to the open top of the vehicle; and
    a latch mechanism operably connected to the sunshade panel to lock the sunshade panel into a position and prevent sliding of the sunshade panel.

2. The assembly of claim 1, wherein the set of clamps are configured to connect to a roll bar on a driver side of the vehicle and a roll bar on a passenger side of the vehicle such that the pair of support beams are connected to the opposing sides of the open top.

3. The assembly of claim 1, wherein the outer rails of the pair of support beams connect to the set of clamps such that the inner rails of the pair of support beams on the opposing sides face each other, whereby the sunshade panel moves along the inner rails to at least partially cover the open top of the vehicle the assembly is connected to.

4. The assembly of claim 1, wherein at least one clamp of the set of clamps has a fastener that traversers through a rod at a front of the clamp that connects to one support beam of the pair of support beams, wherein the one support beam has a slot that accepts the fastener.

5. The assembly of claim 1, wherein a front bar is coupled to a front side of the pair of support beams by a pair of end caps, wherein the front bar spans a width of a space between the pair of support beams.

6. The assembly of claim 1, wherein the sunshade panel comprises a plurality of rods and a cover, wherein the plurality of rods includes a front rod, a rear rod, and one or more center rods; and
wherein the cover includes two or more channels equidistant to each other, wherein each channel of the two or more channels is configured for a single rod of the plurality of rods to slide into.

7. The assembly of claim 6, wherein each of the front rod, the rear rod, and the one or more center rods spans a width of the cover, wherein the width of the cover spans a second space between the pair of support beams.

8. The assembly of claim 6, wherein the front rod and the one or more center rods are connected to rod ends, wherein each rod end is connected to ends of the front rod and the one or more center rods, and
wherein the rod ends connect to the inner rails on the pair of support beams and the rod ends are configured to slide on the inner rails to move the cover in an accordion like motion.

9. The assembly of claim 6, wherein the rear rod is connected to a pair of end caps, wherein each end cap of the pair of end caps is connected to an end of the rear rod, and
wherein the pair of end caps connect to a back end of the pair of support beams such that the rear rod is stationary.

10. The assembly of claim 6, wherein the latch mechanism is connected to a handle, wherein the handle is connected to the front rod, the latch mechanism comprising:
an actuator piece connected to the handle;
a pair of wires connected to the actuator piece, wherein the pair of wires are disposed within the front rod and extend away from each other toward each end of the front rod;
a pair of rod inserts, wherein each end of the front rod is connected to a rod insert of the pair of rod inserts; and
a pair of latch pins connected to the pair of wires, wherein each rod insert holds a latch pin of the pair of latch pins and a connected spring.

11. The assembly of claim 10, wherein the latch mechanism engages with one or more pin slots on an inner rail of at least one support beam of the pair of support beams, wherein the latch pin of the pair of latch pins can move into and out of a pin slot of the one or more pin slots on the inner rail, wherein
the latch mechanism is engaged when the latch pin of the pair of latch pins is inserted into the pin slot of the one or more pin slots on the inner rail to hold the sunshade panel from sliding within the pair of support beams, wherein the latch mechanism is disengaged when the latch pin is removed from the pin slot of the one or more pin slots allowing the sunshade panel to slide within the pair of support beams.

12. The assembly of claim 11, wherein the latch mechanism is disengaged when a pressure is applied to the actuator piece by a squeezing motion, wherein the actuator piece pulls on the pair of wires connected to the pair of latch pins whereby the latch pins are pulled out of the pin slots of the one or more pin slots in the pair of support beams, and
the latch mechanism is reengaged when the pressure is released from the actuator piece moving the latch pin into a pin slot of the one or more slot.

13. An assembly for covering an open top in a vehicle, the assembly comprising:
a sunshade panel configured to cover the open top of the vehicle, wherein the sunshade panel is movable between an open position and a closed position;
a pair of support beams connectable to the sunshade panel, wherein the pair of support beams are positioned on opposing sides of the open top, wherein the sunshade panel spans between the pair of support beams, wherein the pair of support beams are configured to guide a movement of the sunshade panel;
a set of clamps connectable to the pair of support beams, wherein the set of clamps removably connect the pair of support beams and the sunshade panel to the open top of the vehicle;
a pair of fairings connected to the set of clamps, wherein each fairing of the pair of fairings is positioned on opposing sides of the open top; and
a latch mechanism operably connected to the sunshade panel to lock the sunshade panel into a position and prevent automatic sliding of the sunshade panel.

14. The assembly of claim 13, wherein the set of clamps are configured to connect to a roll bar on a driver side of the vehicle and a roll bar on a passenger side of the vehicle such that the pair of support beams are connected to the opposing sides of the open top.

15. The assembly of claim 13, wherein each support beam of the pair of support beams has an outer rail and an inner rail, wherein the outer rails connect to the set of clamps such that the inner rails on the opposing sides face each other, whereby the inner rails connect to the sunshade panel to at least partially cover the open top of the vehicle the assembly is connected to.

16. The assembly of claim 13, wherein at least one clamp of the set of clamps has a fastener that traversers through a rod at a front of the clamp that connects to one support beam of the pair of support beams, wherein the one support beam has a slot that accepts the fastener.

17. The assembly of claim 13, wherein a front bar is coupled to a front side of the pair of support beams by a pair of end caps, wherein the front bar spans a width of a space between the pair of support beams.

18. The assembly of claim 13, wherein the sunshade panel comprises a plurality of rods and a cover, wherein the plurality of rods includes a front rod, a rear rod, and one or more center rods; and
wherein the cover includes two or more channels equidistant to each other, wherein each channel of the two or more channels is configured for a single rod of the plurality of rods to slide into.

19. The assembly of claim 18, wherein each of the front rod, the rear rod, and the one or more center rods spans a width of the cover, wherein the width of the cover spans a space between the pair of support beams.

20. The assembly of claim 18, wherein the front rod and the one or more center rods are connected to rod ends, wherein each rod end is connected to ends of the front rod and the one or more center rods, and wherein the rod ends connect to an inner rail on each support beam of the pair of support beams and the rod ends are configured to slide on the inner rails to move the cover in an accordion like motion.

21. The assembly of claim 18, wherein the rear rod is connected to a pair of end caps, wherein each end cap of the pair of end caps is connected to an end of the rear rod, and
wherein the pair of end caps connect to a back end of the pair of support beams such that the rear rod is stationary.

22. The assembly of claim 18, wherein the latch mechanism is connected to a handle, wherein the handle is connected to the front rod, the latch mechanism comprising:
an actuator piece connected to the handle;
a pair of wires connected to the actuator piece, wherein the pair of wires are disposed within the front rod and extend away from each other toward each end of the front rod;
a pair of rod inserts, wherein each end of the front rod is connected to a rod insert of the pair of rod inserts; and
a pair of latch pins connected to the pair of wires, wherein each rod insert of the pair of rod inserts holds a latch pin and a connected spring.

23. The assembly of claim 22, wherein the latch mechanism engages with one or more pin slots on an inner rail of at least one support beam, wherein each latch pin of the pair of latch pins can move into and out of a pin slot of the one or more pin slots, wherein
the latch mechanism is engaged when each latch pin of the pair of latch pins is inserted into a pin slot of the one or more pin slots to prevent the sunshade panel from sliding within the pair of support beams, wherein the latch mechanism is disengaged when the each latch pin of the pair of latch pins is removed from the pin slot of the one or more pin slots allowing the sunshade panel to slide within the pair of support beams.

24. The assembly of claim 23, wherein the latch mechanism is disengaged when a pressure is applied to the actuator piece by a squeezing motion, wherein the actuator piece pulls on the pair of wires connected to the pair of latch pins whereby the pair of latch pins are pulled out of the one or more slots in the pair of support beams, and
the latch mechanism is reengaged when the pressure is released from the actuator piece moving each latch pin of the pair of latch pins into the pin slot of the one or more pin slots.

\* \* \* \* \*